United States Patent [19]
Lee et al.

[11] Patent Number: 6,068,865
[45] Date of Patent: May 30, 2000

[54] CHOCOLATE YOGURT AND PREPARATION

[75] Inventors: Thomas D. Lee, Scarsdale; William J. Dell, Wappinger Falls; Madeline M. Bissonnette, Mahopac, all of N.Y.; David J. Barnard, Des Plaines, Ill.

[73] Assignee: Kraft Foods, Inc, Northfield, Ill.

[21] Appl. No.: 08/965,897

[22] Filed: Nov. 7, 1997

[51] Int. Cl.$^7$ ........................................... A23C 9/13
[52] U.S. Cl. ..................... 426/43; 426/115; 426/583; 426/120; 426/584
[58] Field of Search ..................... 426/43, 583, 584, 426/580, 115, 120

[56] References Cited

U.S. PATENT DOCUMENTS

| | | | |
|---|---|---|---|
| 2,121,442 | 6/1938 | Nordsick . | |
| 2,739,751 | 3/1956 | Bailey | 426/120 |
| 2,850,388 | 9/1958 | Peebles et al. | 426/285 |
| 3,932,680 | 1/1976 | Egli et al. | 426/43 |
| 4,163,802 | 8/1979 | Redfern et al. | 426/43 |
| 4,233,325 | 11/1980 | Slangan et al. | 42/107 |
| 4,876,106 | 10/1989 | Sabatura | 426/583 |
| 4,952,414 | 8/1990 | Kaufman et al. | 426/93 |
| 5,002,779 | 3/1991 | Mehansho et al. | 426/72 |
| 5,264,228 | 11/1993 | Pray et al. | 426/285 |
| 5,487,904 | 1/1996 | Caly | 426/96 |
| 5,518,744 | 5/1996 | Kaeser et al. | 426/90 |
| 5,670,344 | 9/1997 | Menansho et al. | 426/74 |

FOREIGN PATENT DOCUMENTS

| | | |
|---|---|---|
| 000643139 | 12/1992 | Australia . |
| 674023 | 11/1963 | Canada . |
| 0002037 | 5/1979 | European Pat. Off. . |
| 2728-940 | 1/1979 | Germany . |

OTHER PUBLICATIONS

In re Levin, 84 USPQ 232 (CCPA Dec. 1949).
Vafiadis, "Pour It Down", Dairy Field, Journal 178 (9), pp. 58–62, Sep. 1995.

*Primary Examiner*—Nina Bhat
*Assistant Examiner*—Sherry A. Dauerman
*Attorney, Agent, or Firm*—Thomas R. Savoie; Thomas A. Marcoux

[57] ABSTRACT

A chocolate yogurt containing active cultures and having a diminished acid taste compatible with chocolate and a new product form that enables the enjoyment of the product utilizing only normal channels of distribution are enabled by separately preparing and packaging a yogurt base portion and a chocolate flavoring portion. The yogurt base portion contains active cultures and has a pH of less than about 4.6. The chocolate flavoring portion containing cocoa, nonfat dry milk solids, and a buffering salt. The two portions are packed, preferably, in a two-piece composite package. The two packages are opened and the contents mixed just prior to consumption.

15 Claims, 1 Drawing Sheet

CHOCOLATE YOGURT AND PREPARATION

TECHNICAL FIELD

The invention relates to chocolate yogurt, and particularly to a chocolate yogurt containing active cultures and having a diminished acid taste compatible with chocolate, a new product form that enables the enjoyment of the product utilizing only normal channels of distribution, and processes for preparing them.

Yogurt has been prepared for centuries in essentially the same way. Simply, pasteurized milk is inoculated with a preferred culture and held at a suitable temperature for long enough (e.g., 3 to 6 hours) for the active cultures to grow in the milk. A natural consequence of the culturing process is the development of a sour taste due to the production of lactic acid. The acid has several benefits, including providing a clean, fresh taste and aiding preservation. If the yogurt is made with good manufacturing practices and cultured until the pH is less than about 4.6, the product should be stable for several weeks under refrigeration.

However, the acid flavor is incompatible with some flavors such as chocolate. Attempts to reduce the acid flavor by the use of buffering salts is not effective because the salts tend to increase the pH to an extent that preservation cannot be assured. Heating the yogurt to assure stability kills the active cultures, making the product less desirable to many consumers. Also, the buffering tends to add an off flavor, incompatible with both yogurt and chocolate.

While a number of efforts have been made to address these interrelated problems, the art is in need of effective solutions. There are few chocolate-flavored yogurt products on the market. The use of this invention will enable manufacture and distribution of a chocolate-flavored yogurt having active cultures, a pH of less than 4.6 and greatly diminished acid flavor.

BACKGROUND ART

Yogurt has been a favorite in the diet of many cultures for centuries. It is prepared from milk, a highly nutritious food, and has achieved a reputation as being a relatively healthy source of nutrition. Indeed, its reputation for health goes beyond mere nutrition. It is relatively low in fat and is associated with healthy digestion and other benefits. As a consequence, people are wanting to expand its use from plain and acid-compatible flavors for single servings and as salad dressings and fruit toppings, to provide satisfying desserts. It has an appealing, tart taste. That taste is, unfortunately, not compatible with all flavors—notably, chocolate.

A number of commercial chocolate yogurt products have been introduced, but all of them have been criticized for their inability to adequately mask the sourness of yogurt. Sugar alone does not adequately meet the need. And, the addition of large amounts of buffering salts, starch or other materials can either affect the process of fermentation or reduce the stability of the final product.

One commercial product employs a compartmentalized package containing a flavored yogurt in one compartment and a very sweet syrup in another. The package is opened by removing a top seal and the contents are mixed to the degree desired by the consumer. Despite the high sweetness, the product still has a sourness incompatible with chocolate as most people know and enjoy it.

Another commercial product has a high starch and sugar content, but has been heat treated to kill off the starter culture and extend its shelf life. Many yogurt lovers insist on yogurt products with live and active cultures, and products of this type do not meet their expectations.

Other products have appeared with a chocolate flavor, without adequately addressing the tartness. These have been disappointments to many people having an expectation of chocolate enjoyment.

In our own work, we have experimented with buffering salts, but these either increase the pH to the point that stability in the refrigerator is diminished, cause an off flavor, or both.

There remains a need for a chocolate yogurt containing active cultures and having a non-acid taste compatible with chocolate, a new product form that enables the enjoyment of the product utilizing only normal channels of distribution, and processes for preparing them.

DISCLOSURE OF THE INVENTION

It is an object of the invention to provide a process for preparing a chocolate yogurt containing active cultures and having a diminished acid taste compatible with chocolate.

It is another object of the invention to provide a new product form for chocolate yogurt that enables the enjoyment of the product utilizing only normal channels of distribution.

It is another object of the invention to provide a process for preparing a chocolate yogurt containing active cultures and having a diminished acid taste compatible with chocolate.

It is another object of the invention to provide a process for preparing a new product form for chocolate yogurt that enables the enjoyment of the product utilizing only normal channels of distribution.

These and other objects are achieved by the present invention, which provides a chocolate yogurt containing active cultures and having a diminished acid taste compatible with chocolate, a new product form that enables the enjoyment of the product utilizing only normal channels of distribution, and processes for preparing them.

In one aspect, the yogurt product comprises: a yogurt base portion containing active cultures and having a pH of less than about 4.6; and a separate chocolate flavoring portion containing cocoa, nonfat dry milk solids, and a buffering salt.

In another aspect, the new form of product comprises a composite package having two separately sealed compartments, comprising: a first compartment containing a yogurt base portion containing active cultures and having a pH of less than about 4.6; and a second compartment containing a chocolate flavoring portion containing cocoa, nonfat dry milk solids, and a buffering salt.

A preferred form of the process of the invention calls for: preparing a yogurt base portion containing active cultures and having a pH of less than about 4.6; preparing a separate chocolate flavoring portion containing cocoa, nonfat dry milk solids, and a buffering salt; and packaging the two portions in separate compartments in a composite package.

Many of the preferred aspects of the invention are described below.

BRIEF DESCRIPTION OF THE DRAWINGS

The invention will be better understood and its advantages will become more apparent in view of the following detailed description, especially when read with reference to the appended drawings wherein.

INDUSTRIAL APPLICABILITY

Figure 1:
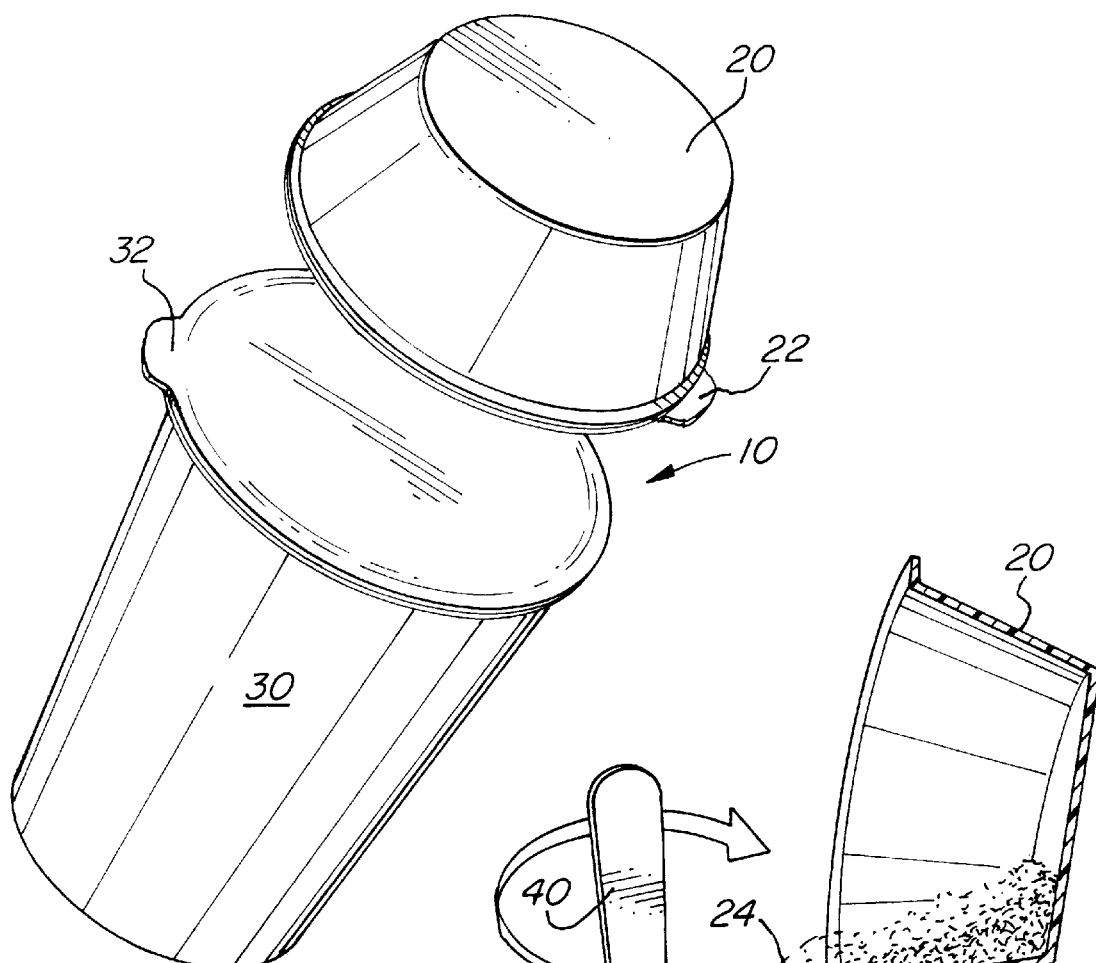
FIG. 1 is a perspective view, in exploded form showing a preferred package according to the invention.

The following description will illustrate the preparation of preferred products of the invention to provide the person skilled in the art with the information necessary to make these products as well as variations of them using equivalent materials and methods.

The term "yogurt" is used herein to mean all of those products meeting the definition as set forth in 21 C.F.R. Section 131.200, 131.203, and 131.206. The preferred products of the invention contain live and active cultures. Generally, these products are made by fermenting milk or a milk mix with a symbiotic blend of *Streptococcus salvarius*, (e.g., subsp. *thermophilus*) and *Lactobacillus debruechii*, (e.g., subsp. *bulgaricus*). See Hui, Dairy Science & Technology Handbook, Vol. 2., Product Manufacturing, 1993, pp. 1–55, and the references cited therein for a more detailed description, which is hereby incorporated by reference. The result is a semisolid fermented product having clean taste and quick melting action in the mouth. The culture may be augmented to also contain additional microbes, including *Lactobacillus acidophilus, Bifidobacteria bifidus*, etc.

The invention calls for yogurt to be prepared in conventional fashion and packaged as an individual yogurt base portion. A chocolate flavoring portion, is another separate portion, which is prepared and packaged in a manner to keep it separate from the yogurt base portion until just before consumption when the two are mixed by the consumer.

Preparation of the Chocolate Flavoring Portion

In accord with the invention, it has been determined that to achieve the objective of a chocolate-flavored yogurt having a flavor compatible with chocolate with no off flavor and suitable refrigerated stability, it is necessary to mix a chocolate flavoring portion with a yogurt base portion just before consumption. The chocolate flavoring portion will be in suitable dry or liquid form to enable good mixing with the yogurt base portion. The preferred form is dry because it is simple to mix and package. Accordingly, the following description will center on the preparation of the chocolate flavoring portion as a dry mix.

The chocolate flavoring portion is specially formulated to reduce the acid, sour taste of the yogurt base portion. Essential to its composition are the presence of both non-fat dry milk and buffering salts in a combined amount sufficient to quench the sour taste of a pH 4.2 to 4.6 yogurt base. It is preferred, but not essential, to include a sweetener in the chocolate flavoring portion, but the sweetener can sometimes more easily be incorporated in the base yogurt portion.

The non-fat dry milk component can be any of those commercial forms available that does not have adulterants or has not been treated in a manner incompatible with its use in yogurt. The non-fat dry milk will be employed, based on its weight to the weight of the finished product, other than added sweeteners and bulky flavors, of from about 2 to about 8%. For ease of description, and technical consistency, percentages of the yogurt base portion will exclude added sweeteners and bulky flavors. When the milk mix for preparing the yogurt base portion does not contain added non-fat dry milk, the amount of non-fat dry milk in the chocolate flavoring component will in the range of from about 20 to about 30%.

The buffering salt will be one with a flavor compatible with yogurt and chocolate flavors and yet have the ability to reduce the acidity of the yogurt. And it is important that its combination with the non-fat dry milk component according to the invention, not provide a metallic or other off flavor as would appear if the combination were not employed. Among the suitable buffering salts are disodium phosphate, sodium, potassium or calcium lactate or citrate and tetrasodium pyrophosphate. The buffering salt will be employed in an amount sufficient, with the above-noted presence of non-fat dry milk, to achieve a reduction in the acid taste and bring the pH of the yogurt to above 4.6. Preferably, the buffering salt will be employed at a concentration of at least about 0.25% up to about 1% based on its weight to the weight of the finished product, other than added sweeteners and bulky flavors and preferably in the range of from about a 0.4 to about 0.6%. The buffering salt will typically be present in the chocolate flavoring portion at a level of from about 1.8 to 4% preferably 1.8 to 2.6%.

The chocolate flavoring portion will of necessity include cocoa in a suitable form. Dry cocoa powder is a preferred form. The cocoa powder can be dutched and can include additives of the type employed in the art to achieve good flow and dispersant properties. The cocoa powder will be employed in an amount sufficient to provide a desired chocolate flavor to the final product. The cocoa can be employed entirely within the chocolate flavoring portion, or a portion of it or chocolate enhancing flavors can be employed in the yogurt base composition. The chocolate flavoring based on the weight of dry cocoa powder to the weight of the finished product except for bulky flavors, will be at least 1%, and preferably from about 2 to about 4%. Cocoa will typically comprise from 8 to 20% of the chocolate flavoring portion, preferably from about 12 to about 16%.

The chocolate flavoring portion will also preferably include a sweetener when one is not employed in the yogurt base portion. Sweeteners can be natural sugars and materials containing them or can be synthetic or intense sweeteners.

The term "sugar" is to be understood as meaning any of a number of useful saccharide materials. Included in the list of useful sugars are the mono-saccharides, disaccharides and polysaccharides and their degradation products; e.g., pentoses, including aldopentoses, methylpentoses, keptopentoses, like xylose and arabinose; a deoxyaldose like rhamnose, hexoses and reducing saccharides such as aldo hexoses like glucose, galactose and mannose; the ketohexoses, like fructose and sorbose; disaccharides, like lactose and maltose; non-reducing disaccharides such as a sucrose and other polysaccharides such as dextrin and raffinose; and hydrolyzed starches which contain as their constituents oligosaccharides. A number of sugar syrups, including corn syrup, high fructose corn syrup, molasses, and the like, are common sources as are various granular and powdered forms.

The weight of sugar (as sucrose) will comprise at least 10%, and preferably from 13 to 21%, of the final mixed product. In the case where the sweetener is sucrose and is all provided in the chocolate flavoring portion, it will comprise at least 35%, e.g., from 50 to 65% of the weight of this portion. In this case the ratio of weight of the yogurt base portion excluding any bulky fillers, to the weight of the chocolate flavoring portion will preferably be within the range of from about 3:1 to 5:1, e.g., from about 3.4:1 to about 4.2:1. High intensity sweeteners may be used in like proportion, based on their relative sweetnesses, and the above ratios will be adjusted accordingly.

Among the intense sweeteners are aspartame, acesulfame-K, saccharin, cyclamate, neohesperidin dihydrochalcone, thaumatin, sucralose, alitame, stevioside, glycyrrhzin, Lo Han Guo, and the like. Also, low-intensity, low-calorie sweeteners such as sorbitol, mannitol, xylitol and erythritol can be employed.

The chocolate flavoring portion can additionally contain common binding agents such as glycerin or water or emulsifiers and dispersants, such as polyoxyalkylene fatty acid esters, e.g., Tween 80. The chocolate flavoring portion, when dry is preferably granulated to a weight average particle size within the range of from about 5 to about 100 microns, (M). Alternatively, the dry chocolate flavoring portion can be compressed or otherwise formed into tablets of decorative shape, such as stars, chips, sprinkles and the like. The chocolate flavoring portion can be agglomerated using water, steam, glycerol or other agglomerating agents to ensure quick distribution when blended with the yogurt base portion.

Preparation of the Yogurt Base Portion

The yogurt base portion is prepared in any manner consistent with the preparation of a high quality yogurt, preferably with live and active cultures. Essentially, the process will entail heating milk, or a milk mix containing other permitted ingredients, under conditions effective to inactivate any organisms present in the milk or milk mix. The milk or milk mix is then inoculated with a suitable culture (with a symbiotic blend of *Streptococcus salvarius* (e.g., subsp. *themophilus*) and *Lactobacillus debruechii* (e.g., subsp. *bulgaricus*) and held for a time sufficient to develop the typical yogurt texture and taste. Holding at near 20 to 55° C. for from 3 to 6 hours is typical. The final pH will typically be within the range of from about 4.2 to about 4.6. Following this step of culturing, the yogurt is cooled to stop the culturing but not inactivate or kill the culture.

The source of the milk can be any of those sources as, by tradition, regulation or standards, have come into favor. Principal among these are milk from cows, sheep, goats, buffalo, and the like. The milk can be fresh or in other forms permitted by regulation, including milk mixes with non-fat dry milk or the like. Various other materials can also be added to the milk mix prior to fermentation so long as they do not adversely affect the final quality of the yogurt or change its identity. For simplicity in description, the term "milk" as used herein is also intended to include culturable milk mixes as permitted by regulation. Fat content of the milk can be infinitely varied depending on various commercial or regulatory requirements.

The yogurt base portion can be sweetened or mixed with bulky or other flavors as appropriate and understood by the art. For example, sugar or other sweeteners can be added prior to fermentation, so long as it is not used in such large amounts to unduly inhibit the fermentation. Bulky flavorings, such as syrups, jams, fruits in various forms (typically sweetened and of controlled pH to preserve their taste and color) and the like, can be added to the container prior to fermentation or mixed with yogurt prior to packaging.

When a bulky flavoring or sweetener is added to the yogurt after fermentation, the natural consistency of the yogurt is modified and it becomes necessary to add stabilizers of a type and in an amount sufficient to restore a natural yogurt-like texture. Stabilizers can also be added prior to naturally setting the yogurt for the purpose of enhancing smoothness and decreasing syneresis during long periods of storage. Typical of the stabilizers are proteinaceous materials, such as gelatin, and whey protein concentrate, natural and synthetic hydrophilic colloids, such as carboxymethyl cellulose, vegetable/fruit gums, such as locust bean gum, carob bean gum, guar gum, pectin, carrageenans and alginates, and various starches and modified starches. The stabilizers are typically added prior to fermentation to assure thorough mixing with least effect on natural texture.

Figure 2:
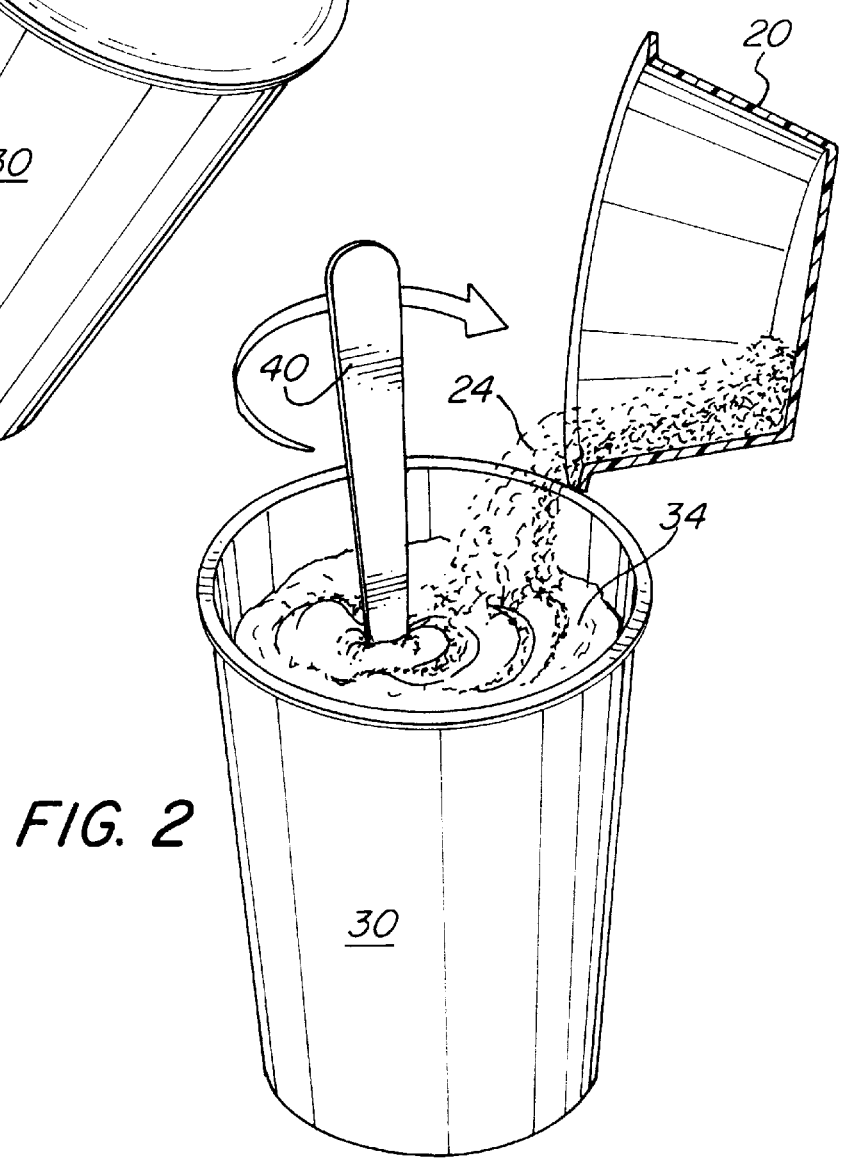
FIG. 2 is a perspective view, schematically representing the final mixing of the product of the invention just prior to consumption.

The two portions are preferably packaged in separate, but adjoining and complementary compartments, such as shown for example in FIG. 1 which shows a package 10 in perspective view, in exploded form, having a top portion 20 and bottom portion 30. Top portion 20 is sealed with a foil cover 22, and bottom portion 30 is similarly sealed with a foil cover 32. The foils can be of plastic, metal or composite construction as is known in the art. They can be sealed by heat sealing or adhesive. FIG. 2 is a perspective view showing the final mixing of the product of the invention just prior to consumption. To serve the yogurt, the two container parts are opened and the contents mixed, e.g., by stirring the contents of a chocolate flavoring portion 24 container into the a yogurt base 34 in container 30 to achieve uniform mixing, such as with spoon 40 for from 10 seconds to two minutes or so.

Preferred containers of this general type have a lower compartment 30 formed of plastic or composite material to hold the yogurt base portion and a clear plastic top portion 20 to display and hold the chocolate flavoring portion. The two container portions can be separately filled and sealed as is known in the art. Other forms of containers can also be employed to hold the two container portions separate until it is time for mixing and consumption by the consumer.

The following Example is provided to further illustrate and explain a preferred form of the invention and are not to be taken as limiting in any regard. Unless otherwise indicated, all parts and percentages are by weight.

EXAMPLE

A yogurt base portion is prepared by heating milk to sterilization temperature, cooling to room temperature, mixing a suitable culture into the milk, pouring the resulting mixture of milk and culture into six ounce plastic packaging containers, covering the containers, culturing by holding at room temperature for about 4 hours and cooling to refrigerator temperature of about 4° C. A chocolate flavoring portion is separately prepared and packaged. This portion is prepared from the following ingredients:

| Ingredient | % In Chocolate Flavoring Portion | % Finished Product |
| --- | --- | --- |
| Sucrose | 57.2 | 17 |
| Cocoa Powder (dutched) | 14.4 | 3 |
| Disodium Phosphate | 2.2 | 0.44 |
| Non-Fat Dry Milk Solids | 24.5 | 5 |
| Flavors | 1.7 | 0.48 |

The ratio of the weight of the yogurt base portion to that of the chocolate flavoring portion is about 4:1.

As a comparison, a second sample was prepared wherein the non-fat dry milk in the chocolate flavoring portion was removed and the disodium phosphate content was increased to 10%, sufficient to increase the pH to 5.8. This second sample had a distinct chemical/bitter off-taste.

The above description is intended to enable the person skilled in the art to practice the invention. It is not intended to detail all of the possible modifications and variations that will become apparent to the skilled worker upon reading the description. It is intended, however, that all such modifications and variations be included within the scope of the invention which is defined by the following claims. The claims are meant to cover the indicated elements and steps in any arrangement or sequence which is effective to meet the objectives intended for the invention, unless the context specifically indicates the contrary.

What is claimed is:

1. A mix for preparing chocolate yogurt containing active cultures and having a diminished-acid taste compatible with chocolate, comprising:

a packaged yogurt base portion containing active cultures and having a pH of less than about 4.6; and a separately packaged chocolate flavoring portion containing cocoa, nonfat dry milk solids, and a buffering salt;

the packages for said yogurt base portion and said separately packaged chocolate flavoring portion being held together to keep the two portions separate until they are mixed together prior to serving to achieve a chocolate-flavored yogurt that has a chocolate flavor and a diminished-acid taste compatible with the chocolate flavor.

2. A chocolate yogurt product according to claim 1, wherein the buffering salt comprises disodium phosphate.

3. A chocolate yogurt product according to claim 1, wherein the non-fat dry milk solids is employed in amount of from about 20 to about 30% and the buffering salt is employed in amount of from about 1.8 to about 4%, both based on the weight of the chocolate flavoring portion.

4. A chocolate yogurt product according to claim 1, wherein the chocolate flavoring component comprises sucrose as a sweetener and the ratio of the weight of the yogurt base portion to that of the chocolate flavoring component is within the range of from 3:1 to 5:1.

5. A chocolate yogurt product according to claim 1, wherein the chocolate flavoring component comprises cocoa powder in an amount of from about 2 to about 8% of the weight of the chocolate yogurt product.

6. A packaged chocolate yogurt product having a composite package with two separately sealed compartments, comprising:

a first compartment containing a yogurt base portion containing active cultures and having a pH of less than about 4.6; and a second compartment containing a chocolate flavoring portion containing cocoa, nonfat dry milk solids, and a buffering salt.

7. A packaged chocolate yogurt product according to claim 6, wherein the buffering salt comprises disodium phosphate.

8. A packaged chocolate yogurt product according to claim 6, wherein the non-fat dry milk solids is employed in amount of from about 20 to about 30% and the buffering salt is employed in amount of from about 1.8 to about 4%, both based on the weight of the chocolate flavoring portion.

9. A packaged chocolate yogurt product according to claim 6, wherein the chocolate flavoring component comprises sucrose as a sweetener and the ratio of the weight of the yogurt base portion to that of the chocolate flavoring component is within the range of from 3:1 to 5:1.

10. A packaged chocolate yogurt product according to claim 6, wherein chocolate flavoring component comprises cocoa powder in an amount of from about 2 to about 8% of the weight of the chocolate yogurt product.

11. A process preparing a packaged mix for preparing a chocolate yogurt product, comprising:

preparing a yogurt base portion containing active cultures and having a pH of less than about 4.6;

preparing a separate chocolate flavoring portion containing cocoa, nonfat dry milk solids, and a buffering salt; and packaging the two portions in separate compartments in a composite package.

12. A process according to claim 11 for preparing a packaged yogurt product, wherein the buffering salt comprises disodium phosphate.

13. A process according to claim 11 for preparing a packaged yogurt product, wherein the non-fat dry milk solids is employed in amount of from about 20 to about 30% and the buffering salt is employed in amount of from about 1.6 to about 4%, both based on the weight of the chocolate flavoring portion.

14. A process according to claim 11 for preparing a packaged yogurt product, wherein the chocolate flavoring component comprises sucrose as a sweetener and the ratio of the weight of the yogurt base portion to that of the chocolate flavoring component is within the range of from 3:1 to 5:1.

15. A process according to claim 11 for preparing a packaged yogurt product, wherein chocolate flavoring component comprises cocoa powder in an amount of from about 2 to about 8% of the weight of the chocolate yogurt product.

\* \* \* \* \*